United States Patent [19]
Doyle et al.

[11] 3,757,530
[45] Sept. 11, 1973

[54] COOLING SYSTEM FOR DATA PROCESSING APPARATUS

[75] Inventors: Michael A. Doyle, Blaine; Roger W. Cree, Stillwater; Richard C. Keller, St. Paul, all of Minn.

[73] Assignee: Control Data Corporation, Minneapolis, Minn.

[22] Filed: Apr. 12, 1972

[21] Appl. No.: 243,141

[52] U.S. Cl............ 62/117, 62/224, 62/225, 62/511, 62/524, 62/528, 62/56
[51] Int. Cl. ............................................. F25b 5/00
[58] Field of Search................ 62/224, 225, 117, 62/525, 511, 527, 528, 524

[56] References Cited
UNITED STATES PATENTS

| | | | |
|---|---|---|---|
| 2,148,414 | 2/1939 | Wolfert | 62/525 |
| 2,409,661 | 10/1946 | Carter | 62/225 |
| 2,534,272 | 12/1950 | Kleist | 62/525 |
| 2,669,099 | 2/1954 | Inalkoff | 62/225 |
| 2,707,868 | 5/1955 | Goodman | 62/225 |
| 3,577,743 | 5/1971 | Long | 62/225 |

*Primary Examiner*—William J. Wye
*Attorney*—Joseph A. Genovese et al.

[57] ABSTRACT

A refrigeration system is provided for an electronic computer in which a plurality of parallel refrigeration lines are derived from a single source of liquified refrigerant and in which each of the parallel refrigeration lines passes through a plurality of cold plates over which the computer logic modules are adapted to fit. Partially gaseous and partially liquid refrigerant is recombined from the parallel refrigeration lines at a manifold and passes through additional elements of the computer assembly, such as power supply devices, where it becomes superheated and is returned to the source of refrigerant. Refrigerant flow in the individual parallel channels need not be exactly balanced, but a rough balance of refrigerant flow may be obtained by providing additional heat to a parallel channel having adequate cooling reserve capacity, as measured by liquid refrigerant flow in its output, so as to increase the cooling load on the entire system thereby causing increased refrigerant flow through a channel having insufficient cooling capacity as measured by low volume or no volume of liquified refrigerant in its output.

4 Claims, 2 Drawing Figures

COOLING SYSTEM FOR DATA PROCESSING APPARATUS

BACKGROUND OF THE INVENTION

This invention relates to refrigeration systems in general, and more particularly to a refrigeration system adapted for the cooling of the electronic circuitry of a data processing system.

In the electronic computer art, it has been found desirable to cool the electronic elements of the computer through a process of conduction to a cold plate rather than relying on a forced flow of chilled air maintaining the components throughout the system at approximately the same desired temperature. It is well known that, because of dead spots and low heat capacity, air cooling does not provide the same degree of cooling for all components in an entire computer system.

In prior art, such as that shown in the patent to Roush et al., U.S. Pat. No. 3,334,684, the individual logic modules of the computer were designed with one or more highly heat conducting surfaces extending inwardly to circuit boards on which electronic components were mounted. The heat conduction flow was therefore from the components and the wire leads to the heat conductive boards and thence to the exterior of the logic module. The frame of the computer was provided with a plurality of shelves in the form of cold panels, for example, which had a large area of contact with the exterior surface of the logic module thus conducting heat from the logic module to provide a more uniform and easily controlled environmental temperature for the electrical components of the system than was possible by air flow.

As the computer art has developed since the previously referenced patent, integrated circuit packages are now being used in computers by mounting groups of such packages on individual circuit boards. The integrated circuit packages occupy a relatively small volume compared to discrete components and consequently a greater number of transistors and other circuit components can be utilized in a given volume of space than formerly. This space utilization results in increased power dissipation in a given volume within the computer while at the same time the components require a greater degree of temperature regulation and freedom from overheating than previously.

It is not uncommon, for example, for an individual rack of equipment in a modern computer to require several kilovolt amperes of power for the logic components. All of this power is dissipated essentially as heat and may require at least the equivalent of two or three tons of refrigeration capacity per equipment rack in order to provide proper cooling. This degree of cooling requires a relatively large volume of refrigerant flow and such a volume of refrigerant flow could not be handled in a single conveniently sized piece of piping for connecting all cold panels in a system in series from top to bottom as shown in the Rousch et al reference. In addition, because of the desire to provide increased control over the temperature within individual modules rather than allowing heat to flow generally from the interior of the module to the outside contact area with the cold plate, a system which allows some temperature differences or unevenness within the module itself, it was desired to have cooling within the module itself.

Therefore, a cold plate was designed over which the logic module would be mounted so as to have the various electrical components in a more direct heat conduction path than in the prior art. Heat conductive areas of the logic module are in contact with either side of the cold plate so as to maintain the various integrated circuit elements at a controlled temperature on an essentially individual basis. In order to produce a small size logic module with the relatively short electrical connections required for high speed operation of a modern computer, the cold plate could not be extremely large but still had to be of such a size so as to carry a sufficient flow to maintain the various integrated circuit elements at a controlled temperature on an individual basis. This also supports a limitation that all of the refrigerant for the entire system could not be conducted in series through all of the cold panels provided because of the pipe size required to carry the refrigerant. This is true particularly where the number of cold panels or cold plates provided in a cooling system for an individual logic panel in a computer would require a significantly larger number of cold panels than in the prior art where cooling was merely provided for a comparatively few individual shelves on which logic modules were placed.

Parallel refrigeration systems are known where the refrigerant flow is branched off at a central manifold into a plurality of parallel cooling channels. However, such prior art systems must be accurately balanced to distribute refrigerant to a plurality of capillary tubes so that the output of each parallel channel results in a stream of slightly superheated refrigerant (i.e., completely evaporated and containing no liquid) for return passage to the refrigeration compressor unit. This is required in order to maximize efficiency of the system and to prevent any liquid refrigerant from being returned to the compressor. Balancing such parallel prior art refrigeration systems has been difficult because either the heat load in each path must be essentially equal or the capillary tubes individually sized for each path. It is quite difficult to balance a parallel flow system if the heat load varies widely from path to path. It can be appreciated that it would be difficult to design a parallel flow cooling system for an electronic computer since not all logic modules or components dissipate the same quantity of heat nor are the individual equipment racks sufficiently similar so as to provide an easily identifiable grouping of parallel channels which would tend to have the same heat dissipation characteristics such as would allow convenient balancing of a cooling system. It is desirable, if not necessary, to have a standardized computer cooling system that does not require individual customized set up procedures for each unit of the system to obtain a proper operating balance.

Therefore, it can be appreciated that an improved cooling system is required for the modern electronic computer. From what has been previously described, it can be appreciated that a desirable direction for this new cooling system requires a significant development of refrigerant control in parallel flow cooling systems in order to provide an improved cooling system for an electronic computer.

SUMMARY OF THE INVENTION

This invention is an improved cooling system adapted for an electronic computer. More particularly this is a cooling system which may be used with an electronic computer having relatively high logic density and power dissipation per unit volume within the physical housing of the computer.

Individual assemblies or modules of logic components are prepared in units having an interior cavity such that the entire unit may be placed over a cooling system cold plate forming a part of the computer chassis. Each cold plate is an evaporator in the cooling system. The individual cold plates have a refrigerant coil trained therethrough and heat conducting material therein so that the cold plate remains at an essentially even temperature as governed by evaporation of circulating refrigerant. In the form of the invention shown herein, the individual cold plates are arranged in a group of columns, each column having a number of cold plates connected in series with the other cold plates in the same column. The individual columns are connected in parallel to a source of pressurized, liquified refrigerant through a distributor system.

The outputs of the parallel refrigerant lines from the logic module cold plates are recombined in a manifold in partially expended form, with both gaseous and liquid refrigerant present, and passed through additional heat dissipating elements associated with a given computer chassis. Generally, this would be equipment such as power supply heat sinks for rectifiers, transformers, and choke coils. The output refrigerant from the last cooled element in the computer chassis is regulated to a superheated condition, by means of a sensing element, such as a thermistor, controlling a refrigerant expansion valve in the refrigerant supply line to the equipment. In this way, the refrigerant from the individual parallel channels flowing through the logic modules need not be accurately regulated to a balanced, superheated condition since the refrigerant is superheated, to provide a suitable return to the refrigeration system, in power supply type heat dissipating elements.

If one of the parallel refrigerant channels is receiving an inadequate flow of refrigerant and has a tendency to produce superheated gas exclusively as its output or has an inadequate reserve of liquid refrigerant remaining in the output thereof, the refrigerant flow may be roughly regulated by providing an additional heat source in one of the other parallel refrigerant columns which has an adequate flow of refrigerant. Such a channel might be a channel in which one or more logic module cold plates is unoccupied by any computer logic modules. The regulation is accomplished by placing a heat producing dummy module over a cold plate so as to cause additional evaporation of refrigerant in the system thereby causing the refrigerant flow control system to call for more refrigerant flow through the cooling system. Since refrigerant is divided into a plurality of parallel channels, there will be additional refrigerant flow through the refrigerant channel lacking in cooling capacity.

IN THE FIGURES

DESCRIPTION OF THE PREFERRED EMBODIMENT

Figures 1, 2:
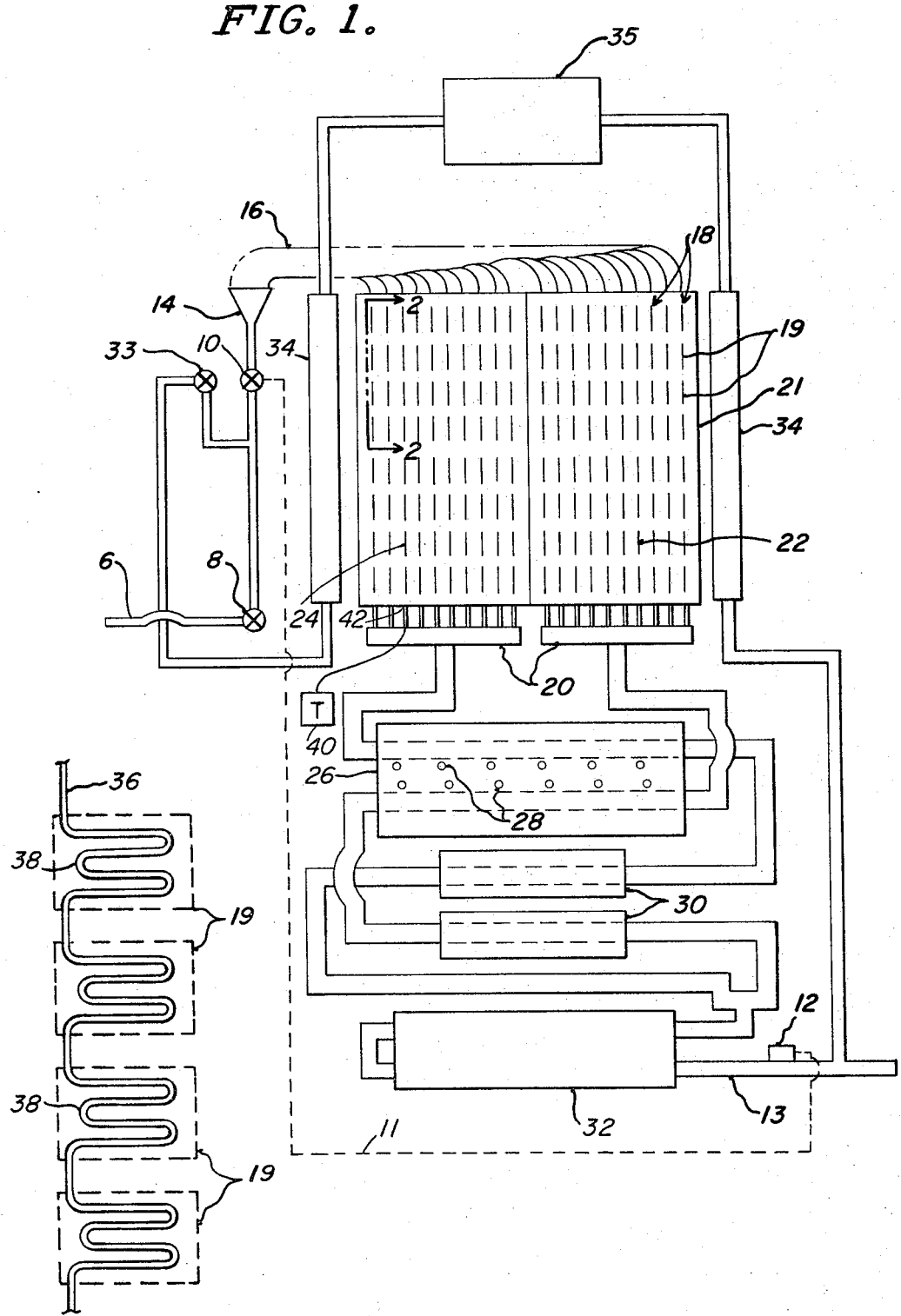
FIG. 1 is a semi-schematic diagram of a cooling system according to the present invention.
FIG. 2 is a sectional view along lines 2—2 of FIG. 1.

Referring now to FIG. 1 showing a schematic diagram of a cooling system for an electronic computer, condensed (i.e., compressed, liquified) refrigerant is admitted through a pipe 6 and control valve 8 to the cooling system from a conventional refrigeration compressor unit or other means for providing condensed refrigerant (not shown) to a variable flow expansion valve 10, which preferably will be of a type having a very rapid response to control signals for regulating refrigerant flow through the system. The regulation and operation of the expansion valve 10 is controlled by control signals generated by a sensing element 12 placed at the output of the cooling system. The connection between valve 10 and sensor 12 is schematically indicated in FIG. 1 by dashed line 11. The sensing element 12 is preferably of a sensitive type which responds quickly to variations in temperature of the refrigerant passing into a return line 13 to the refrigeration unit. One suitable component for this application would be a thermistor used for controlling an electrically operated expansion valve 10.

The outlet of the expansion valve 10 is conveyed to a manifold distributor 14 which connects with a group of parallel capillary tubes generally designated 16. The distributor 14 is of a conventional type having a venturi nozzle in the interior thereof so that all of the capillary tubes extending therefrom have essentially the same flow rate. In the form of the invention shown, 20 capillary tubes extend from distributor 14 to 20 columns of cold plates adapted for logic modules. These capillary tubes are formed of essentially equal length so that the flow resistance of each tube will be identical, thereby tending to balance the flow rate within the system.

It is possible, if necessary, to balance the capillary tube distribution system by adjusting the length of a given capillary tube such that the total pressure drop in the column of evaporator (cooling) plates and the capillary tube is equal to the pressure drop of the same system of another column having a different heat load. This is not the most desirable method of balancing a refrigeration system as it requires customization of the unit and destroys the advantages of standardization. This method is therefore generally employed only to correct gross imbalances in the system. A more desirable method of correcting imbalance in the cooling system will be described below.

Each of the capillary tubes 16 is connected to a vertical column 18 of cold plates 19 each of which serve as an evaporator in the cooling system. The columns of cold plates are mounted on a supporting frame plate 21. Each cold plate 19 is designed for the placement of a logic module thereon. The cold plates do not necessarily all have logic modules thereon nor does each type of logic module necessarily dissipate the same amount of heat. Therefore, of the twenty columns of cold plates, the heat dissipation per column will generally differ from column to column. Refrigerant is collected in both gaseous and liquid form in manifolds 20 from each of the vertical columns 18 of cold plates 19. As will be explained in greater detail, the system is designed so that not all of the refrigerant is evaporated in any of the columns 19 but that only a certain percentage of the refrigerant is evaporated in each column with variations among the columns in evaporation percentage. Thus, some unevaporated refrigerant is collected from each column, thereby leaving a reserve cooling capacity in each column. This reserve cooling capacity provides a substantial safety margin for the logic modules of the computer system to counteract any overheating condition caused by a malfunctioning or overheating module, for example. The percentage of evaporation may be altered to a greater or lesser figure within the scope of the invention and the exact figure is not critical to the invention. For example, approximately 75 percent evaporation may be maintained leaving 25 percent evaporation as a safety margin in the individual columns and cumulatively, for cooling power supply elements.

The remaining refrigerant in liquid form collected in manifolds 20 is passed through additional heat sinks in the computer chassis. Typically, a rack of computer equipment will contain a power supply unit for that equipment rack which is necessary with computer systems requiring many hundreds of amperes of very low voltage direct current. The rectifiers, transformers, and choke coils associated with such low voltage high amperage power supplies require cooling, but are somewhat less critical in cooling requirements than the individual logic modules performing the computing functions within the computer. Therefore, the remaining refrigerant collected by the manifolds is allowed to pass through the various heat sinks associated with this power supply completely evaporating the liquid refrigerant and allowing the gaseous refrigerant to become slightly superheated. The slightly superheated condition is necessary to insure that all the refrigerant is evaporated and allow the temperature sensing control unit to regulate the flow of refrigerant through the system. The temperature sensor is allowed to increase refrigerant flow as the temperature of the gaseous exhausted refrigerant rises above a predetermined temperature, slightly higher than the evaporation temperature of the refrigerant. Of course, if a power supply is not present in a particular equipment rack, any heat source may be used to evaporate refrigerant collected in manifolds 20.

In the form of the invention shown, refrigerant collected in manifolds 20 is passed through a main power supply heat sink 26, providing counter flow cooling for the power supply rectifier diodes 28. Refrigerant is then passed through heat sinks 30 associated with the filter choke coils for the main power supply. Refrigerant finally passes through heat sink 32 associated with another power supply, becomes superheated and passes out of the system through pipe 13 monitored by temperature sensing element 12.

Other elements in the same chassis may be cooled from the same source of refrigerant by using an additional expansion valve 33, as shown, or by routing refrigerant flow from expansion valve 10. As shown in FIG. 1, refrigerant flows to and from a memory module 35 through a pair of vertical heat sinks 34. In FIG. 1, heat sinks 34 are shown in exploded relation to frame 21 which is supported therebetween. Heat sinks 34 provide cooling for such elements as voltage regulating elements mounted thereon. Besides dissipating heat and serving as supporting elements for the frame 21, heat sinks 34 are formed of a good electrical conductor, such as aluminum and serve as a return conductor for the power supply. Each of the power supply returns for the logic modules is connected with frame 21, thus providing a complete return path from logic elements in the logic modules to the power supply connected with the lower ends of heat sinks 34.

FIG. 2 illustrates the formation of a group of cold plates 18 using a single length of refrigerant piping formed in appropriate loops 38 to lie within individual cold plates. The cold plates may be formed of die cast halves of heat conductive material which may be riveted or staked together and filled with a heat conductive thermo-epoxy to insure even temperature distribution on the plate.

In operation, the system is set up with the desired logic modules affixed to the various cold plates on the logic chassis of the computer. The refrigerant output of each of the vertical columns is analyzed separately, by temperature measurements, in order to determine if a rough balance of the various parallel conduits of the system exists. It is an advantage of this invention that the parallel cooling paths do not necessarily have to be exactly balanced. If it is found, however, that one column of refrigerant is being entirely evaporated and producing superheated refrigerant, some rearrangement of the logic modules may be possible to adjust the heat load on the various columns. Alternatively, one significant technique for balancing the system within the predetermined arbitrary limit of unevaporated refrigerant flow from the exhaust of each column, allows the placement of a heating element, similar in form to a logic module 22 for example, over one of the cold plates in one of the vertical columns where no temperature or heat load problem is encountered. Alternatively, a conventional logic module may be provided with additional elements solely for producing extra heat, if no vacancy exists in a column. By providing extra heat dissipation in one of the vertical columns, where there is adequate reserve cooling capacity the refrigerant flow increases through the system as a whole by evaporating more refrigerant in the one column, thus further downstream causing the temperature sensing unit 12 to call for an increased flow of refrigerant. Since the refrigerant is divided approximately equally through the 20 parallel channels of the system, the vertical column having inadequate refrigerant capacity reserve, as measured at logic module 24, for example, thus experiences an increased flow of refrigerant as a result of the heater placed on the vacant logic module cold plate, 22 for example, in the column having sufficient reserve capacity. A thermometer 40 with its sensor bulb or element 42 on the output of the refrigerant column, before the refrigerant enters manifold 20, containing cold plate 24 is one way of measuring refrigerant reserve capacity. If the thermometer indicates an elevated temperature representative of a condition in which superheated refrigerant is flowing in the column, then there is no reserve capacity. It will be seen that this method of increasing total refrigerant flow will thus cause an increase in refrigerant flow in the refrigerant column which is overheating, or has an inadequate reserve capacity, thereby tending to provide proper cooling in all columns of cold plates.

To further illustrate the invention, a specific example will be given, without however limiting the scope of the invention by the example. The example consists of a system of 20 columns each having eight cold plates. Approximately 8,100 watts of electrical energy is dissipated in the cold plates. Valve 10 is a thermoelectric expansion valve supplied the Controls Company of America, a division of Singer Corporation. Refrigerant number 12 is used in the system. The capillary tubes are generally 48 inches long and have an inside diameter of 0.090 inches. The tubing 38 in the cold plates and forming the individual columns has an inside diameter of 0.190 inches. The refrigerant supply through pipe 6 is at 157 p.s.i. gauge pressure. The output pressure of expansion valve 10 is at 73 p.s.i. gauge pressure. Generally, the outlet pressure of the capillary tubes is at 64 p.s.i. gauge pressure.

The cold plates are maintained at approximately 65° Fahrenheit. In the columns some of the refrigerant in the liquid form changes state to the gaseous form. Quality, which is a measure of the ratio of gas to the total mass of refrigerant changes from approximately 10 to 75 percent in the column and consequently the pressure of the refrigerant collected in manifolds 20 is approximately 59 p.s.i. gauge pressure and the temperature remains essentially constant. The refrigerant in outlet pipe 13 is at approximately 56 p.s.i. gauge pressure.

What is claimed is:

1. A conduction cooling system for electronic data processing apparatus comprising:
    a source of refrigerant fluid for use in cooling the apparatus and having both a supply line for condensed refrigerant and a return line for evaporated refrigerant,
    a variable flow expansion valve connected to said refrigerant supply line,
    a plurality of capillary tubes connected with the refrigerant output of said expansion valve,
    a first evaporator consisting of a plurality of parallel cooling lines connected respectively to said capillary tubes and each line having a plurality of cold plates for cooling heat producing elements associated therewith,
    means for collecting refrigerant from the plurality of parallel channels of the refrigerant system,
    a second evaporator connected with said means for collecting refrigerant associated with a heat source independent from the heat producing elements associated with said first evaporator said second evaporator having at least one refrigerant flow path therethrough and a single refrigerant output line, and
    a sensing element for producing a signal for controlling said expansion valve, said element placed on the refrigerant output line from said second evaporator.

2. The cooling system of claim 1 having a manifold distributor placed between said expansion valve and said capillary tubes.

3. The cooling system of claim 1 wherein said sensing element is a temperature sensing thermistor and said variable flow expansion valve is an electrically operated valve.

4. A method of equalizing refrigerant flow in a cooling system of the type having a plurality of parallel cooling lines connected with refrigerant flow from a common variable flow expansion valve, the parallel cooling lines each having independent heat loads, the refrigerant output from the parallel cooling lines being collected and passed through an additional heat load and finally analyzed by a sensing element for regulating said expansion valve, the cooling system being of a type in which the refrigerant flowing in the respective parallel lines is partially evaporated and in which the evaporation is completed in the additional heat load with said sensing element and expansion valve regulating exhausted refrigerant to a slightly superheated condition, the method comprising the steps of:
    first, determining the percentage of refrigerant evaporated in each of the parallel cooling lines so as to determine the reserve of unevaporated refrigerant in each of the parallel cooling lines, and then
    applying additional heat to any one or combination of said parallel cooling lines determined to have an adequate cooling capacity as indicated by the reserve of unevaporated refrigerant in such lines so as to increase total refrigerant flow in the system thereby providing an adequate reserve of unevaporated refrigerant in any one or combination of such lines as determined to have an inadequate flow.

* * * * *